(12) United States Patent
Zhang et al.

(10) Patent No.: US 11,897,128 B2
(45) Date of Patent: Feb. 13, 2024

(54) MODULAR MULTI-HINGE RETRACTABLE RIGID-FLEXIBLE COUPLING SPACE MANIPULATOR BASED ON ORIGAMI STRUCTURE

(71) Applicant: BEIJING UNIVERSITY OF TECHNOLOGY, Beijing (CN)

(72) Inventors: Ziqiang Zhang, Beijing (CN); Zhi Wang, Beijing (CN); Yuchen Zhang, Beijing (CN); Jing Zhao, Beijing (CN); Meng Ning, Wuxi (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/988,541

(22) Filed: Nov. 16, 2022

(65) Prior Publication Data
US 2023/0182285 A1 Jun. 15, 2023

(30) Foreign Application Priority Data
Dec. 15, 2021 (CN) .......................... 202111540150.8

(51) Int. Cl.
*B25J 9/06* (2006.01)
*B25J 18/06* (2006.01)
(52) U.S. Cl.
CPC ................. *B25J 9/06* (2013.01); *B25J 18/06* (2013.01)
(58) Field of Classification Search
CPC ....... B25J 9/06; B25J 9/08; B25J 18/06; B25J 9/0045; B25J 9/0072; B25J 9/0084; B25J 9/009; B25J 9/106
See application file for complete search history.

(56) References Cited

U.S. PATENT DOCUMENTS 4,300,362 A * 11/1981 Lande .................. B25J 17/0266
464/147
10,406,677 B2 * 9/2019 Isobe ...................... F16H 21/46
(Continued)

FOREIGN PATENT DOCUMENTS

CN 105619403 A 6/2016
CN 106313034 A 1/2017
(Continued)

OTHER PUBLICATIONS

Search Report of the priority application CN202111540150.8.

*Primary Examiner* — Bobby Rushing, Jr.
(74) *Attorney, Agent, or Firm* — J.C. PATENTS

(57) ABSTRACT

A modular multi-hinge retractable rigid-flexible coupling space manipulator based on origami structure includes a plurality of folding units and a manipulator base. The modular design idea is adopted for the manipulator, which is formed by combining multiple folding units. the driving motors installed on each folding unit drive the folding units to stretch out, draw back and fold over, so that the manipulator can stretch out and draw back flexibly and bend in any direction to complete the work tasks in a variety of complex environments. For the manipulator, the flexible materials are added to the links of the folding units, and deformation can be effectively compensated, the mechanism is simplified, and impact is relieved. The torsional spring is additionally arranged in the folding units to play a supporting role, so that the manipulator can be placed in forward or in inverted direction to match with various bases. The angle sensor is fixedly connected to the rotating pair formed by the chassis and the folding unit, and the rotating speed of the manipulator is monitored to avoid large impact or damage.

5 Claims, 8 Drawing Sheets

(56) References Cited

U.S. PATENT DOCUMENTS

| | | | | |
|---|---|---|---|---|
| 10,513,028 B2* | 12/2019 | Isobe | ............... | B25J 9/06 |
| 10,556,308 B2* | 2/2020 | Nose | ............... | B25J 9/0048 |
| 11,000,946 B2* | 5/2021 | Nose | ............... | B25J 9/0021 |
| 2009/0084219 A1* | 4/2009 | Rosheim | ............... | F16M 11/18 |
| | | | | 74/5 R |
| 2019/0329422 A1* | 10/2019 | Hongo | ............... | B25J 13/02 |

FOREIGN PATENT DOCUMENTS

| | | |
|---|---|---|
| CN | 109079760 A | 12/2018 |
| CN | 111941446 A | 11/2020 |
| CN | 113021410 A | 6/2021 |
| CN | 113580195 A | 11/2021 |
| CN | 113618778 A | 11/2021 |
| JP | 2021085466 A | 6/2021 |

* cited by examiner

MODULAR MULTI-HINGE RETRACTABLE RIGID-FLEXIBLE COUPLING SPACE MANIPULATOR BASED ON ORIGAMI STRUCTURE

CROSS-REFERENCE TO RELATED APPLICATION

This application claims priority to Chinese application No. 202111540150.8, filed on Dec. 15, 2021, the content of which is hereby incorporated by reference in its entirety and made a part of this specification.

TECHNICAL FIELD

The invention belongs to the field of robots, and disclosed a modular multi-hinge retractable rigid-flexible coupling space manipulator based on origami structure. Specifically, the manipulator adopts a modular design idea, which can flexibly adjust the length, bending angle and rotation direction according to the working environment, especially in some complex working environments such as narrow, high height or long distance.

BACKGROUND

Robots can replace people to complete a variety of complicated and difficult tasks, and are more and more widely used in practical applications. As one of the most commonly used components of robots, the manipulator has higher requirements for the working ability of the manipulator in complex environments with the diversification and complexity of robot tasks. Therefore, it is necessary to design a manipulator with high flexibility, strong adaptability and good reliability.

Chinese patent CN201610184415.8 disclosed "A Bionic Manipulator" which is more flexible and lower in cost than the traditional manipulator, but its motion range is relatively limited so that the scope of work is relatively limited.

In addition, Chinese patent CN202110857184.3 disclosed "A Bionic Manipulator", it adopts the idea of modularization and can adapt to various working environments, but the drive motors are all placed at the bottom, which occupies a large area and can be restricted used in narrow and rugged work.

In view of the problems in the above design, we designed a modular multi-hinge retractable rigid-flexible coupling space manipulator based on origami structure. The manipulator adopts modular idea, each folding unit can flexibly expand and bend to the side, and the drive motor is arranged on the chassis of the folding unit, so when faced with different working environments, the length, bending angle and direction of the manipulator can be flexibly controlled to achieve various complex work tasks.

SUMMARY

The present invention is directed to a modular multi-hinge retractable rigid-flexible coupling space manipulator based on origami structure, which includes a plurality of folding units and a manipulator base. Driving motors installed on each folding unit drive the folding units to stretch out, draw back and fold over, so that the manipulator can stretch out and draw back flexibly and bend in any direction to complete the work tasks in a variety of complex environments. Flexible materials are added to the links of the folding units, and deformation can be effectively compensated. Torsional springs are additionally arranged in the folding units to play a supporting role, so that the manipulator can be placed in forward or in inverted direction to match with various bases. Angle sensors are fixedly connected to the rotating pair formed by the chassis and the folding unit, and the rotating speed of the manipulator is monitored to avoid large impact or damage.

Figure 1:
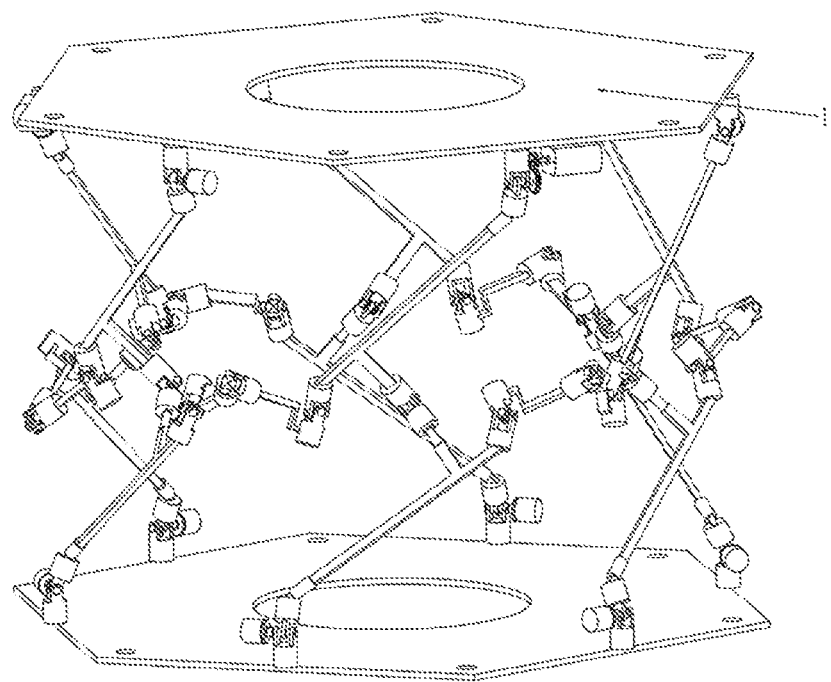
FIG. 1 is the general schematic diagram of folding unit of the present invention.

Wherein, 1-folding unit; 2-manipulator base; 1-1 link group I; 1-2 link group II; 1-3 link group III; 1-4 link group IV; 1-5 link group V; 1-6 link group VI; 1-7 chassis; 1-8 Hooke hinge 1; 2-1 forward base; 2-2 inverted base; 3-1 screw; 3-2 bolt; 3-3 side opening narrow space environment; 3-4 upper opening narrow space environment; 1-1-1 angle sensor; 1-1-2 lower link 1; 1-1-3 Hooke hinge 2; 1-1-4 intermediate link 2; 1-1-5 upper link; 1-1-6 Hooke hinge 3; 1-1-7 intermediate link 1; 1-1-8 torsion spring; 1-2-1 motor; 1-2-2 lower link 2; 1-2-3 Hooke hinge 4; 1-2-4 Hooke hinge 5; 1-2-5 driven gear; 1-2-6 driving gear; 1-2-2-1 flexible material part of the lower link 2; 1-2-2-2 rigid part of the lower link 2; 1-1-5-1 flexible material part of the upper link; 1-1-5-2 the rigid part of the upper link.

PREFERRED EMBODIMENTS

The present invention will be described below with reference to the accompanying drawings and embodiments, but the present invention is not limited to the following embodiments.

The invention designs a modular multi-hinge retractable rigid-flexible coupling space manipulator based on origami structure, which is characterized in that: it is composed of a plurality of folding units (1) and a base (2).

Manipulator with plurality folding units (1) is arranged on the base (2), it is characterized in that:

Each folding unit of the manipulator is connected by bolts (3-2) and nuts (3-2). The manipulator can fit a variety of bases including forward base (2-1) and inverted base (2-2). Manipulator and base are connected by screws (3-1).

The folding unit (1) includes two chassises (1-7) and six groups of links in the middle, and the six groups of links are respectively link group I (1-1), link group II (1-2), link group III (1-3), link group IV (1-4), link group V (1-5) and link group VI (1-6).

The connection of the six groups of links is as follows: link group I (1-1) and link group II (1-2) are connected through Hooke hinge 1 (1-8), link group III (1-3) and link group II (1-2) are connected through Hooke hinge 1 (1-8), link group IV (1-4) and link group III (1-3) are connected by Hooke hinge 1 (1-8), link group V (1-5) and link group IV (1-4) are connected through Hooke hinge 1 (1-8), link group VI (1-6) and link group V (1-5) are connected by Hooke hinge 1 (1-8), link group I (1-1) and link group VI (1-6) are connected by Hooke hinge 1 (1-8). Among them, link group I (1-1), link group III (1-3) and link group V (1-5) have the same structure, and link group II (1-2), link group IV (1-4) and link group VI (1-6) have the same structure. Therefore, only the structure and connection of link group I (1-1) and link group II (1-2) are introduced. Structure and connection of the other four link groups are same with link group I and link group 2 which are temporarily represented by dotted lines.

Link group I (1-1) includes: lower link 1 (1-1-2), angle sensor (1-1-1), upper link (1-1-5), intermediate link 1 (1-1-7), intermediate link 2 (1-1-4), torsion spring (1-1-8); the connection relationship of link group I (1-1) is: lower link 1 (1-1-2) is connected with the chassis (1-7) to forms a rotating pair, and the angle sensor (1-1-1) is fixedly connected with the shaft of the lower link 1 (1-1-2) to monitor the rotation speed of lower link 1 (1-1-2); the upper link (1-1-5) and the chassis (1-7) forms a rotating pair, the angle sensor (1-1-1) fixedly connected with the rotating shaft of upper link (1-1-5) to monitor the rotation speed of the upper link (1-1-5); the lower link 1 (1-1-2) and the upper link (1-1-5) forms a rotating pair, and the torsion spring (1-1-8) is fixed on the shaft of the upper link (1-1-5) to support the folding unit; the intermediate link 1 (1-1-7) connects with the upper link (1-1-5) through the Hooke hinge 3 (1-1-6); the lower link 1 (1-1-2) connects with the intermediate link 2 (1-1-4) through the Hooke hinge 2 (1-1-3) connected.

Link group II (1-2) includes lower link 2 (1-2-2), intermediate link 2 (1-1-4), upper link (1-1-5), intermediate link 1 (1-1-7), driving gear (1-2-6), driven gear (1-2-5), motor (1-2-1) and angle sensor (1-1-1).

The connection relationship of link group II (1-2) is as follows: the lower link 2 (1-2-2) and the chassis (1-7) forms a rotating pair; the motor (1-2-1) is fixed on the chassis (1-7), the rotating shaft of the motor is fixedly connected with the driving gear (1-2-6), and the driven gear (1-2-5) is fixedly connected with the rotating shaft of the lower link 2 (1-2-2), motion and power is transmitted through the meshing of the two gears; the upper link (1-1-5) and the chassis (1-7) forms a rotating pair. The angle sensor (1-1-1) is fixedly connected to the rotating shaft of the upper link (1-1-5) to monitor the rotation speed of the upper link (1-1-5); the lower link 2 (1-2-2) and the upper link (1-1-5) forms a rotating pair; The intermediate link 1 (1-1-7) is connected with the upper link (1-1-5) through the Hooke hinge 5 (1-2-4); the intermediate link 2 (1-1-4) is connected with the lower link 2 (1-2-2) through the Hooke hinge 4 (1-2-3).

The lower link 2 (1-2-2) includes a rigid part (1-2-2-2) and a flexible material part (1-2-2-1) near the end of the rotating shaft. The flexible material is used to compensate for deformation and simplify the mechanism; link (1-1-5) includes a rigid part (1-1-5-2) and a flexible material part (1-1-5-1) near the end of the rotating shaft. The flexible material also plays the role of compensating for deformation and simplifying the mechanism.

The advantages of the present invention are:
1. The invention proposed a modular multi-hinge retractable rigid-flexible coupling space manipulator based on origami structure, which can be folded in multiple directions, adapts different environments and works in narrow and irregular spaces.
2. The present invention proposed a modular multi-hinge retractable rigid-flexible coupling space manipulator based on origami structure, the manipulator adopts a modular idea so that its folding unit can be stacked or reduced as required, and the length of the manipulator can be adjusted simply. The manipulator has highly adaptability.
3. The invention proposed a modular multi-hinge retractable rigid-flexible coupling space manipulator based on origami structure, adding flexible material to the link of the folding unit which can effectively simplify the mechanism, reduce the impact, and improve the stability of the manipulator.
4. The invention proposed a modular multi-hinge retractable rigid-flexible coupling space manipulator based on origami structure, the manipulator has multi-degree-of-freedom, and its movement is controlled by three motors of the lower chassis of each folding unit which is easy to operate.
5. The invention proposed a modular multi-hinge retractable rigid-flexible coupling space manipulator based on origami structure, the folding unit of the manipulator is provided with a torsion spring on the link, which plays a supporting role, so the manipulator can be placed forward and inverted to match with a variety of bases to adapt to a variety of working environments.

The adaptable multi-degree-of-freedom modularized bionic rigid-flexible coupling manipulator of the invention has the advantages of simple structure, good adaptability, high reliability and convenient control.

Embodiment 1

Figure 13:
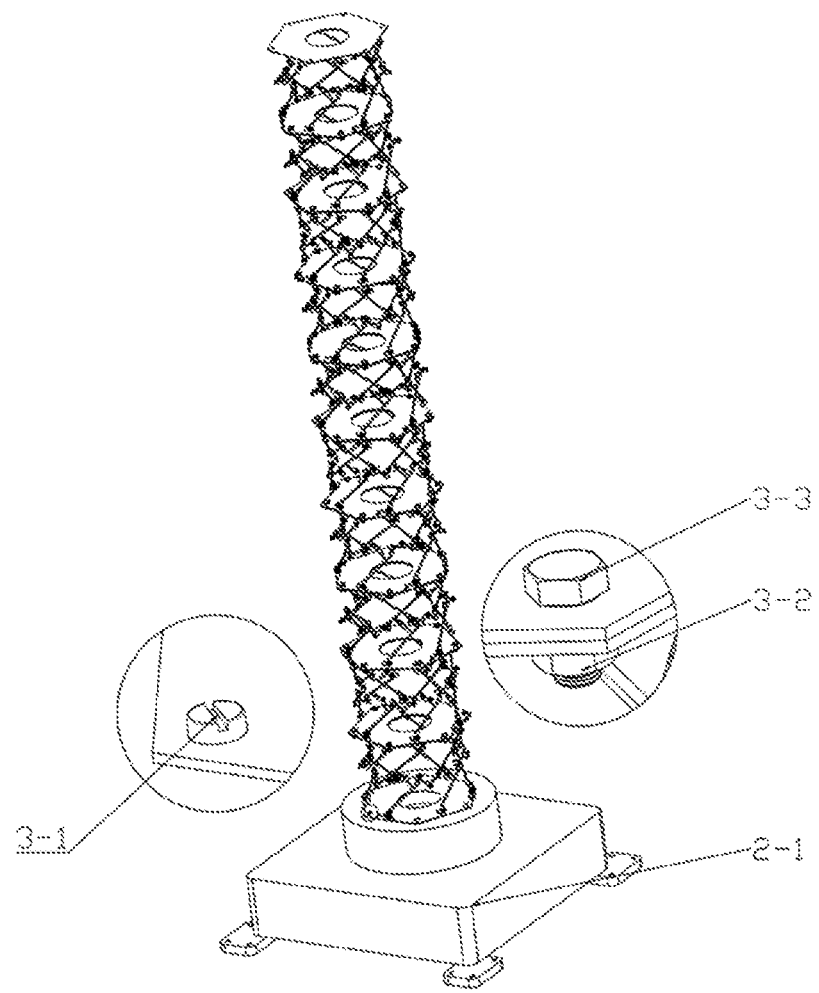
FIG. 13 is the schematic diagram of the manipulator of the present invention.

Referring to FIG. 1 and FIG. 13, the present invention disclosed a modular multi-hinge rigid-flexible coupling manipulator with multi-degree-of-freedom based on an origami structure. It is composed of a plurality of folding units (1) and a base (2).

Figure 2:
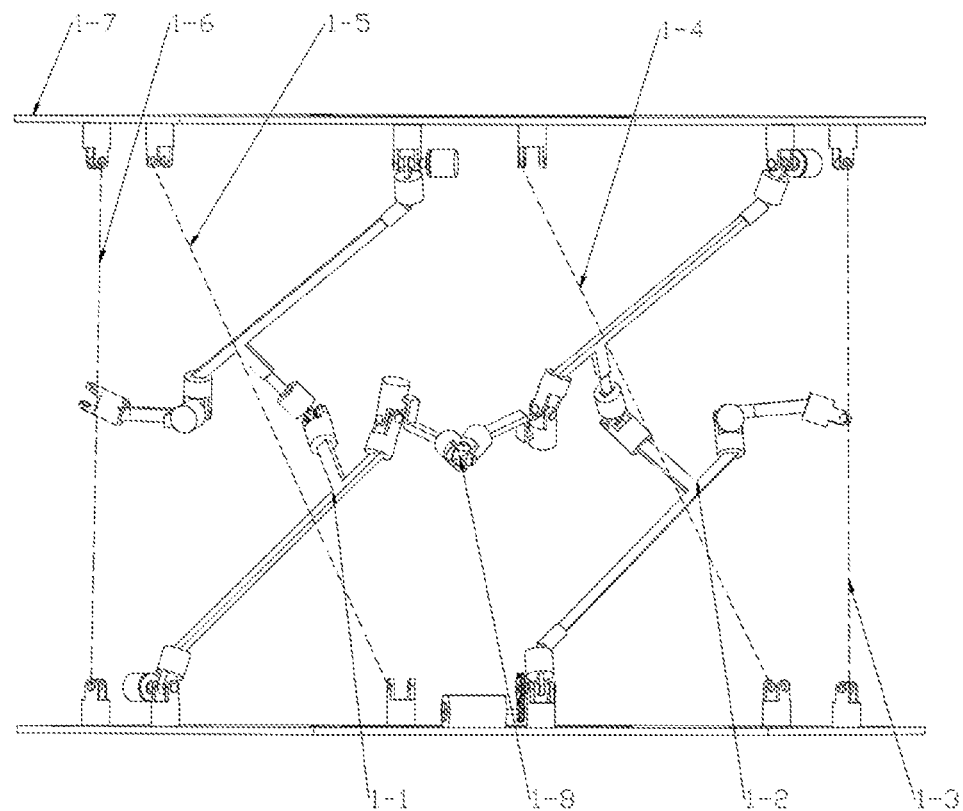
FIG. 2 is a schematic diagram of the connection of two sets of links group of the present invention.
Figure 3:
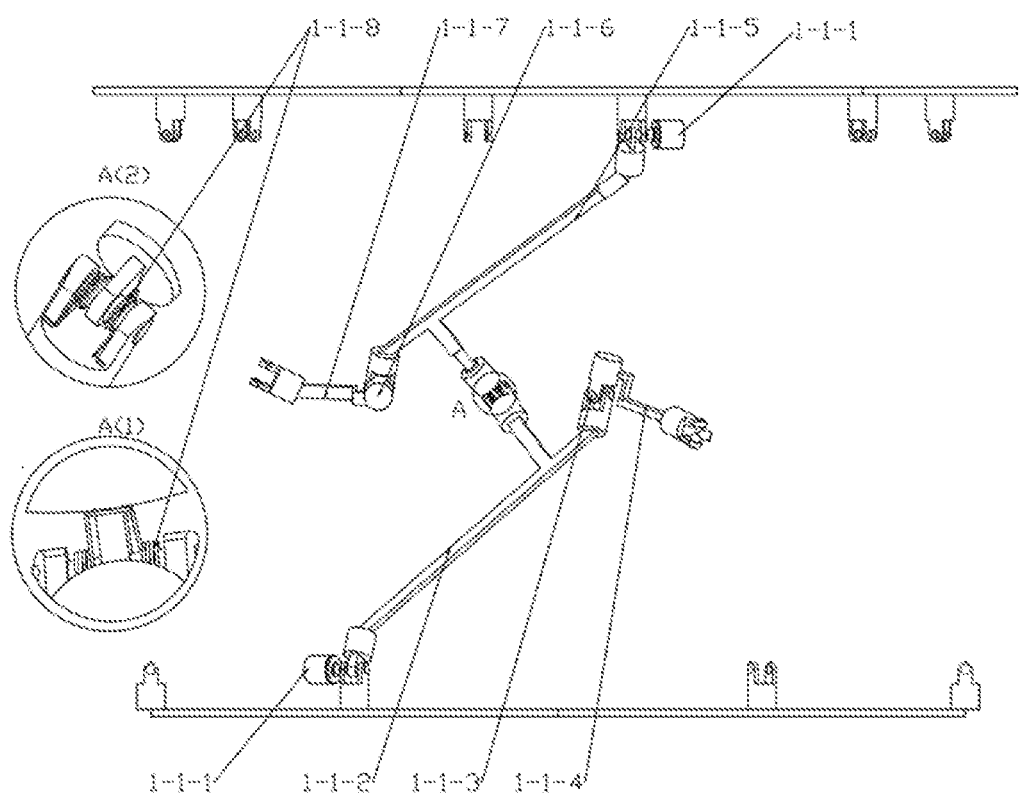
FIG. 3 is a schematic diagram of the structure of a group of links of the present invention.
Figure 4:
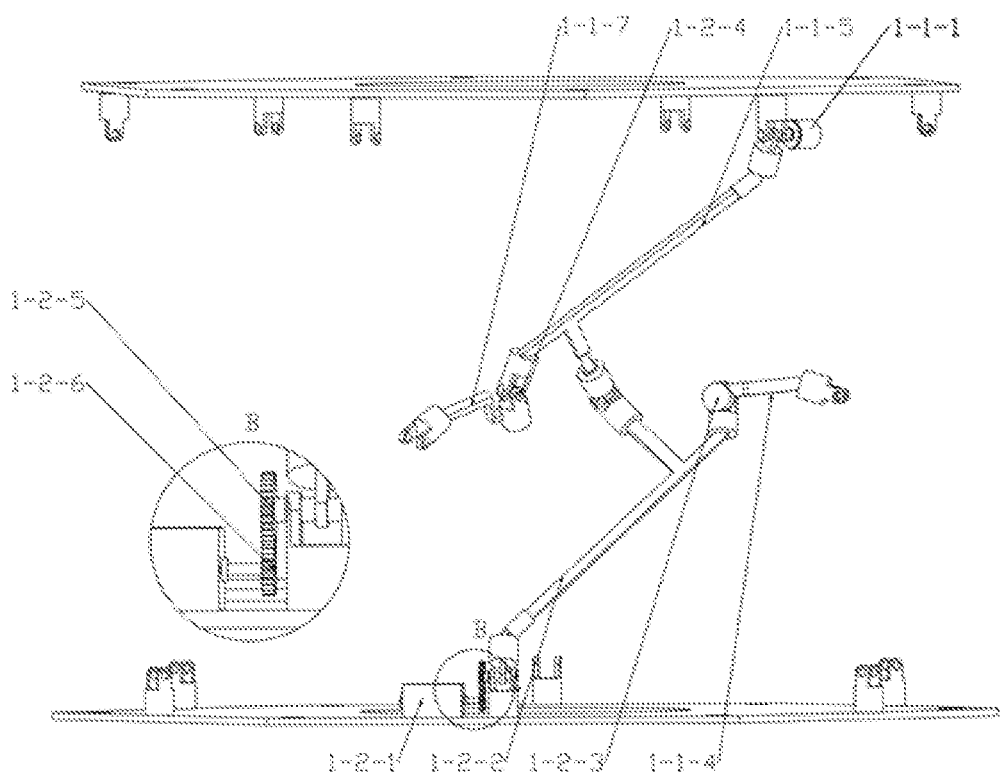
FIG. 4 is a schematic diagram of the structure of another group of links in the present invention.
Figure 5:
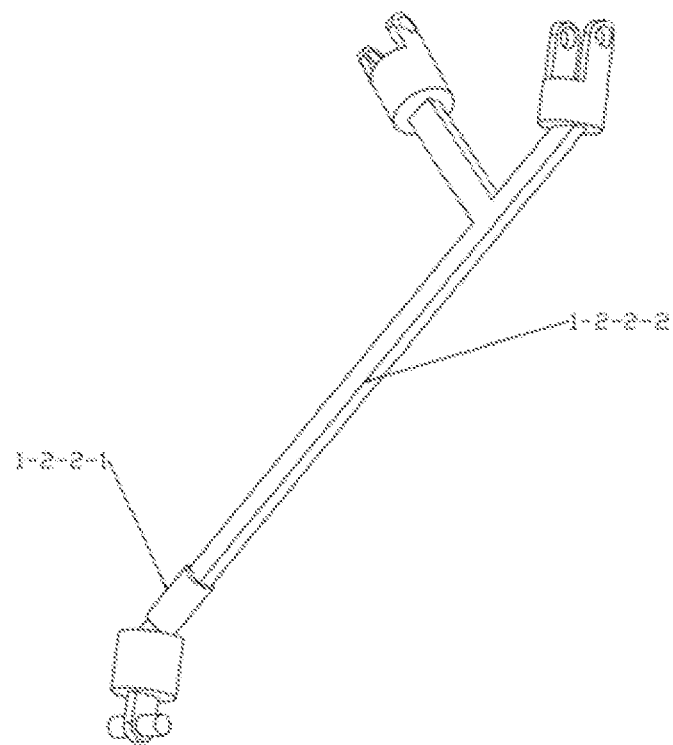
FIG. 5 is the schematic diagrams of links with flexible materials in the folding unit of the present invention.
Figure 6:
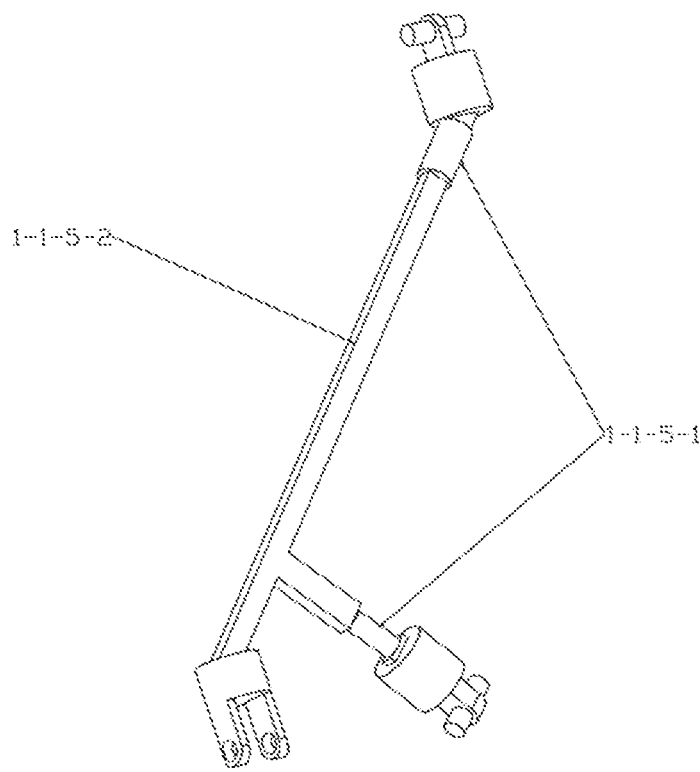
FIG. 6 is the schematic diagrams of links with flexible materials in the folding unit of the present invention.
Figure 7:
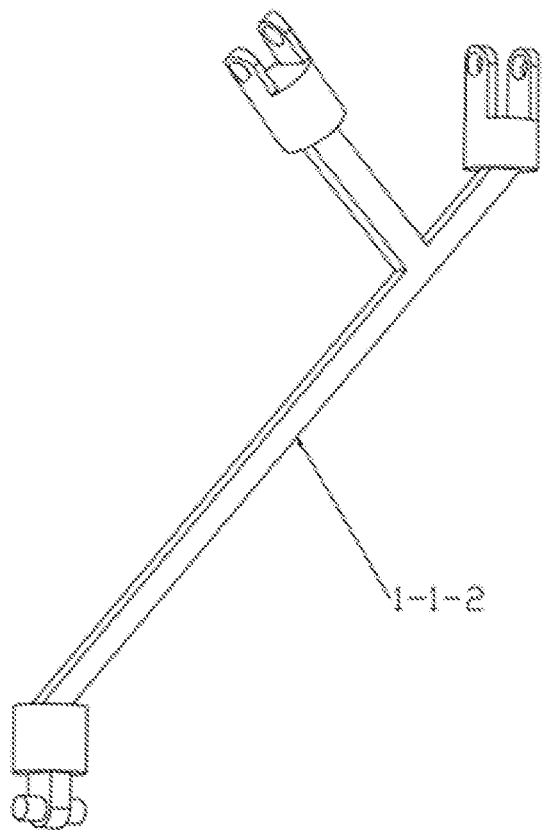
FIG. 7 is the schematic diagram of the link of the folding unit of the present invention.
Figure 8:
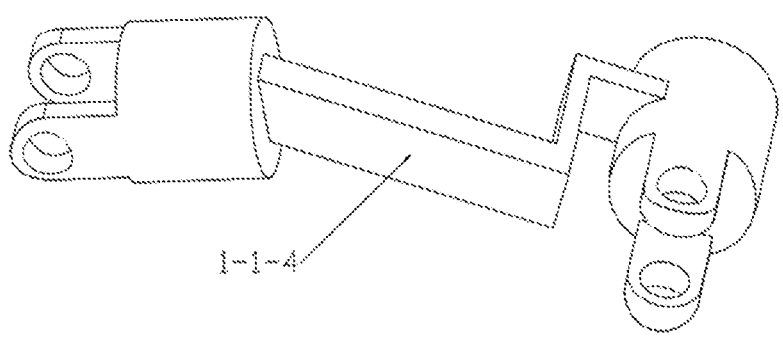
FIG. 8 is the schematic diagram of the link of the folding unit of the present invention.
Figure 9:
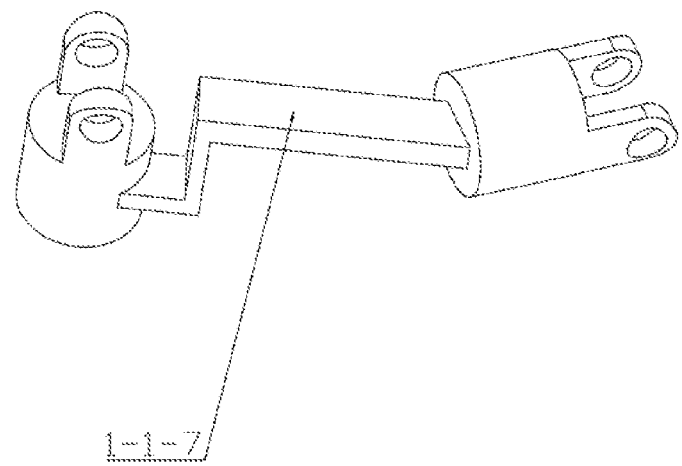
FIG. 9 is the schematic diagram of the link of the folding unit of the present invention.
Figure 10:
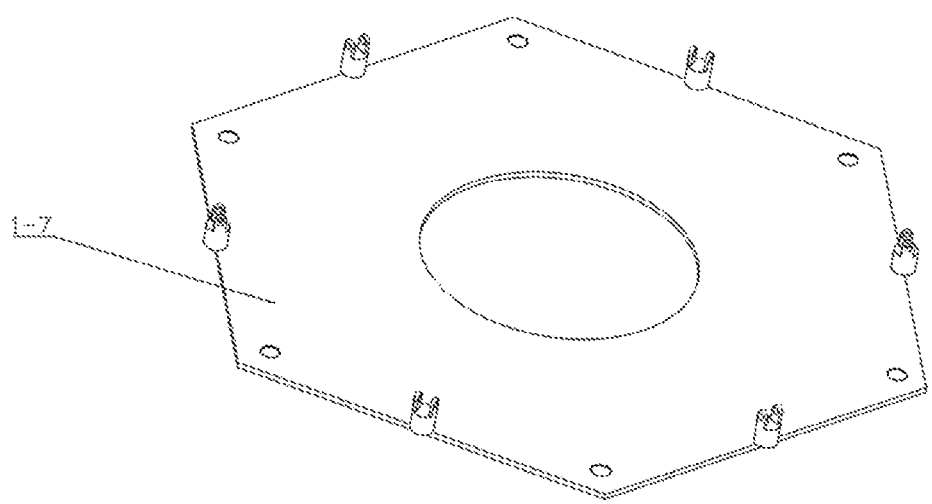
FIG. 10 is a schematic diagram of the chassis of the folding unit of the present invention.
Figure 11:
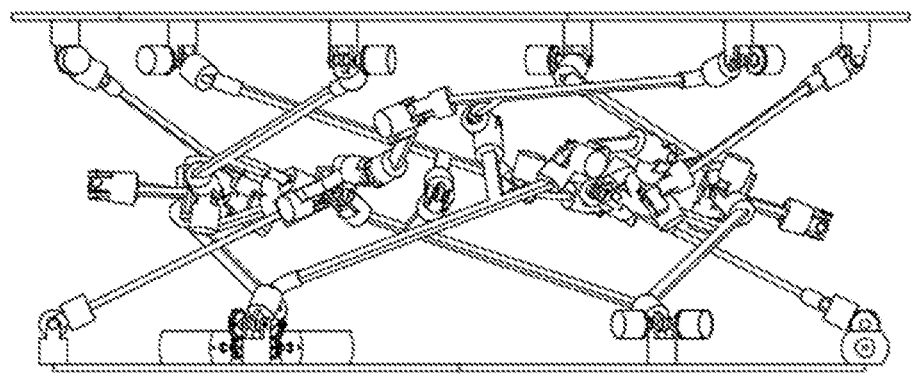
FIG. 11 is the compression diagram of the folding unit of the present invention.
Figure 12:
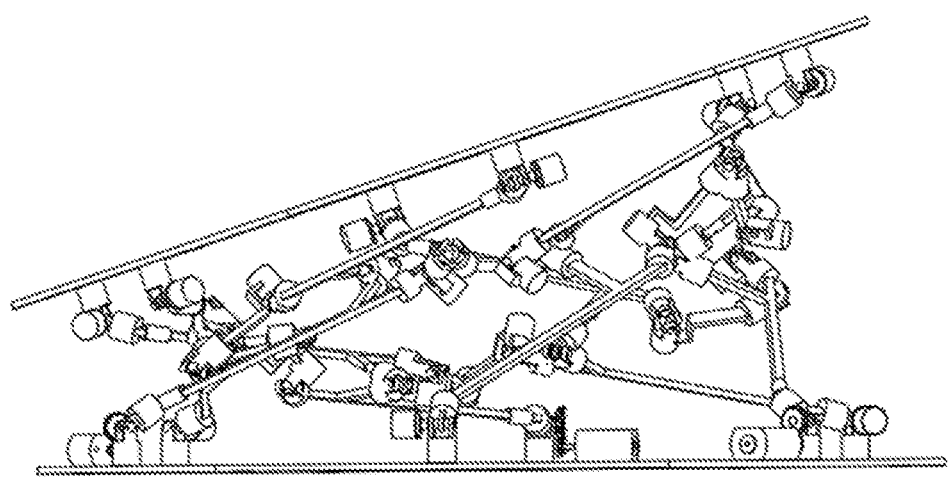
FIG. 12 is the folding diagram of folding unit of the present invention.

Referring to FIG. 2, FIG. 11 and FIG. 12, the folding unit (1) of the manipulator can flexibly realize the extension and turning by adjusting the rotational speed or rotation angle of the drive motor (1-2-1).

Figure 14:
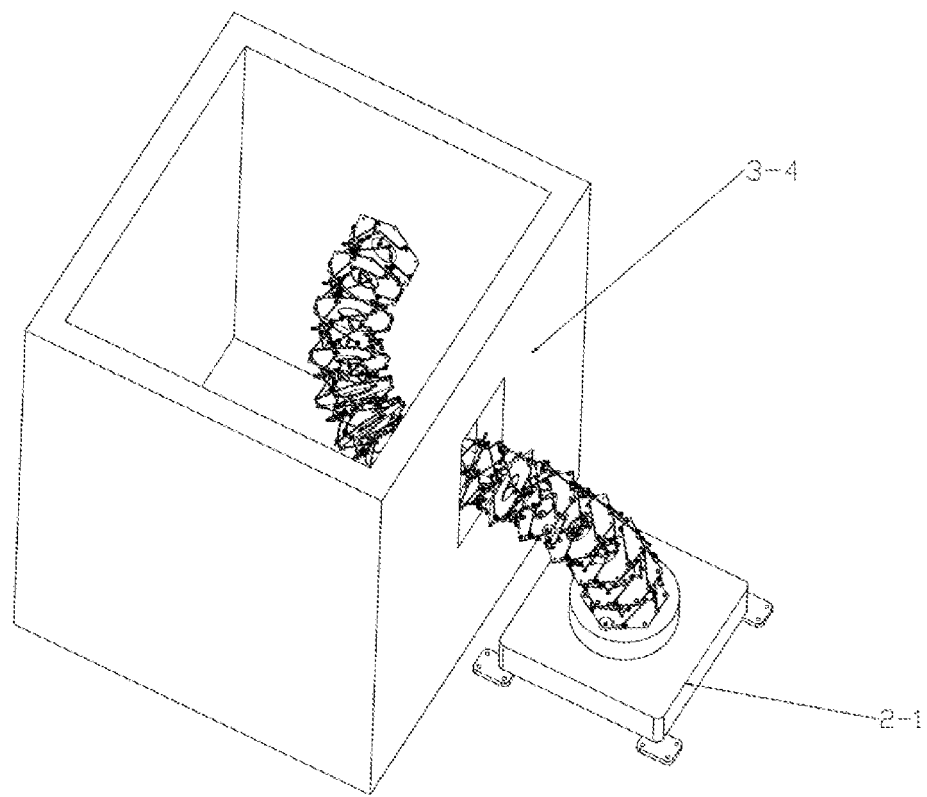
FIG. 14 is the application scenarios of the manipulator of the present invention.
Figure 15:
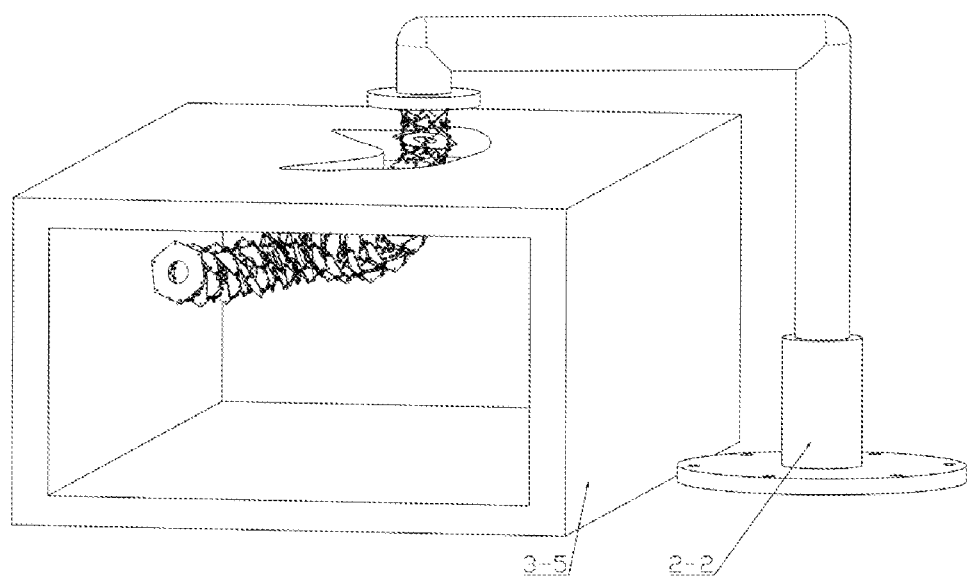
FIG. 15 is the application scenarios of the manipulator of the present invention.

Referring to FIG. 13, FIG. 14 and FIG. 15, plurality of folding units are fixed through the screw holes on the chassis with bolts (3-3) and nuts (3-2). Manipulator and base are connected by screws (3-1).

The manipulator works in a narrow environment, and an appropriate number of folding units (1) are connected to it. Driven by multiple drive motors (1-2-1), the manipulator can be bent in any direction. Therefore, it can be easily extended into small gaps and holes in any direction and stretched to its designated position for work.

The invention claimed is:

1. A modular multi-hinge retractable rigid-flexible coupling space manipulator based on origami structure comprising:

a plurality of folding units (1) and a base (2); a manipulator with a plurality of the folding units (1) being arranged on the base (2); wherein:

each of the folding units (1) includes a lower chassis and an upper chassis (1-7) and six groups of links disposed between the lower and upper chassis, and the six groups of links are respectively link group I (1-1), link group II (1-2), link group III (1-3), link group IV (1-4), link group V (1-5) and link group VI (1-6);

connection of the six groups of links is as follows: link group I (1-1)-and link group II (1-2) are connected through Hooke hinge 1 (1-8), link group III (1-3) and link group II (1-2) are connected through Hooke hinge 1 (1-8), link group IV (1-4) and link group III (1-3) are connected through Hooke hinge 1 (1-8), link group V (1-5) and link group IV (1-4) are connected through Hooke hinge 1 (1-8), link group VI (1-6) and link group V (1-5) are connected through Hooke hinge 1 (1-8), link group I (1-1) and link group VI (1-6) are connected through Hooke hinge 1 (1-8); link group I (1-1), link group III (1-3) and link group V (1-5) have the same structure, and link group II (1-2), link group IV (1-4) and link group VI (1-6) have the same structure; the structure of link group I (1-1) and link group II (1-2) and their connection relationship are as follows:

link group I (1-1) includes: a lower link 1 (1-1-2), a first set of angle sensors (1-1-1), a first upper link (1-1-5), a first intermediate link 1 (1-1-7), a first intermediate link 2 (1-1-4), a torsion spring (1-1-8); the connection relationship of link group I (1-1) is: the lower link 1 (1-1-2) is connected with the lower chassis (1-7) to form a rotating pair, and a first lower angle sensor of the first set of angle sensors (1-1-1) is fixedly connected with a shaft of the lower link 1 (1-1-2) to monitor a rotation speed of the lower link 1 (1-1-2); the first upper link (1-1-5) and the upper chassis (1-7) form a rotating pair, a first upper angle sensor of the first set of angle sensors (1-1-1) is fixedly connected with an upper shaft of the first upper link (1-1-5) to monitor a rotation speed of the first upper link (1-1-5); the lower link 1 (1-1-2) and the first upper link (1-1-5) form a rotating pair, and the torsion spring (1-1-8) is fixed on a lower shaft of the first upper link (1-1-5) to support the folding unit; the first intermediate link 1 (1-1-7) connects with the first upper link (1-1-5) through Hooke hinge 2 (1-1-6); the lower link 1 (1-1-2) connects with the first intermediate link 2 (1-1-4) through Hooke hinge 3 (1-1-3);

link group II (1-2) includes a lower link 2 (1-2-2), a second intermediate link 2 (1-1-4), a second upper link (1-1-5), a second intermediate link 1 (1-1-7), a driving gear (1-2-6), a driven gear (1-2-5), a motor (1-2-1) and a second upper angle sensor (1-1-1);

connection relationship of link group II (1-2) is as follows: the lower link 2 (1-2-2) and the lower chassis (1-7) form a rotating pair; the motor (1-2-1) is fixed on the lower chassis (1-7), a rotating shaft of the motor is fixedly connected with the driving gear (1-2-6), and the driven gear (1-2-5) is fixedly connected with a rotating shaft of the lower link 2 (1-2-2), motion and power is transmitted through two meshing gears; the second upper link (1-1-5) and the upper chassis (1-7) form a rotating pair; the second upper angle sensor (1-1-1) is fixedly connected to a rotating shaft of the second upper link (1-1-5) to monitor a rotation speed of the second upper link (1-1-5); the lower link 2 (1-2-2) and the second upper link (1-1-5) form a rotating pair; the second intermediate link 1 (1-1-7) is connected with the second upper link (1-1-5) through Hooke hinge 5 (1-2-4); the second intermediate link 2 (1-1-4) is connected with the lower link 2 (1-2-2) through Hooke hinge 4 (1-2-3);

lower link 2 (1-2-2) includes a rigid part (1-2-2-2) and a flexible material part (1-2-2-1) near a lower end of lower link 2 (1-2-2); the second upper link (1-1-5) includes a rigid part (1-1-5-2) and a flexible material part (1-1-5-1) near an upper end of the second upper link (1-1-5).

2. The modular multi-hinge retractable rigid-flexible coupling space manipulator based on origami structure according to claim 1, wherein the manipulator can be folded in multiple directions.

3. The modular multi-hinge retractable rigid-flexible coupling space manipulator based on origami structure according to claim 1, wherein the first upper link (1-1-5) includes a rigid part (1-1-5-2) and a flexible material part (1-1-5-1) near an upper end of the first upper link (1-1-5).

4. The modular multi-hinge retractable rigid-flexible coupling space manipulator based on origami structure according to claim 1, wherein the manipulator has multi-degree-of-freedom, and its movements are controlled by three motors of the lower chassis of each folding unit.

5. The modular multi-hinge retractable rigid-flexible coupling space manipulator based on origami structure according to claim 1, wherein the manipulator can be placed forward and inverted to match with a variety of bases; each folding unit of the manipulator is connected by bolts (3-2) and nuts (3-2); the manipulator can fit a variety of bases including forward base (2-1) and inverted base (2-2); manipulator and base are connected by screws (3-1).

* * * * *